US008967860B2

(12) United States Patent
Patalay

(10) Patent No.: US 8,967,860 B2
(45) Date of Patent: Mar. 3, 2015

(54) LOW TEMPERATURE MEASUREMENT AND CONTROL USING LOW TEMPERATURE PYROMETRY

(75) Inventor: Kailash Kiran Patalay, Santa Clara, CA (US)

(73) Assignee: Applied Materials, Inc., Santa Clara, CA (US)

(*) Notice: Subject to any disclaimer, the term of this patent is extended or adjusted under 35 U.S.C. 154(b) by 394 days.

(21) Appl. No.: 13/190,394

(22) Filed: Jul. 25, 2011

(65) Prior Publication Data
US 2012/0201267 A1 Aug. 9, 2012

Related U.S. Application Data

(60) Provisional application No. 61/440,325, filed on Feb. 7, 2011.

(51) Int. Cl.
*G01K 15/00* (2006.01)
*G01K 3/00* (2006.01)
(Continued)

(52) U.S. Cl.
CPC ............ *G01J 5/0007* (2013.01); *G01J 5/0846* (2013.01); *G01J 5/0862* (2013.01); *G01J 5/12* (2013.01); *G01J 5/20* (2013.01); *G01J 5/524* (2013.01); *G01J 2005/0051* (2013.01)
USPC .................. 374/178; 374/1; 374/2; 374/121; 374/129; 702/99; 438/14; 356/43

(58) Field of Classification Search
USPC ........... 374/1, 100, 121, 124, 129, 2, 30, 137, 374/110, 112, 114, 115, 166, 167, 178, 141, 374/179, 126; 702/99, 130; 438/14, 16, 438/758, 799, FOR. 100, FOR. 101; 117/89, 117/200, 201, 202; 356/43
See application file for complete search history.

(56) References Cited

U.S. PATENT DOCUMENTS 4,854,727 A * 8/1989 Pecot et al. ..................... 374/57
5,305,417 A * 4/1994 Najm et al. .................... 392/418
(Continued)

FOREIGN PATENT DOCUMENTS

KR 10-2010-0042114 4/2010

OTHER PUBLICATIONS

International Search Report and Written Opinion dated May 31, 2012 for International Application No. PCT/US2011/0045634.
(Continued)

*Primary Examiner* — Gail Kaplan Verbitsky
(74) *Attorney, Agent, or Firm* — Patterson & Sheridan, LLP

(57) ABSTRACT

Embodiments of the present invention generally relate to methods and apparatus for measuring, calibrating, and controlling substrate temperature during low temperature and high temperature processing. In one embodiment, the method includes epitaxially forming a layer stack on a substrate placed on a support plate, measuring a temperature of the substrate with a first pyrometer disposed over the substrate, measuring a temperature of the support plate with a second pyrometer disposed below the support plate, calibrating the first pyrometer at multiple temperature points based on actual temperature readings of the substrate to generate a first set of calibrated temperature readings associated with the substrate, calibrating the second pyrometer using the set of calibrated temperature readings as a reference to generate a second set of calibrated temperature readings associated with the support plate, and controlling a power supplied to a heat source configured to heat the substrate based on the second set of calibrated temperature readings.

17 Claims, 6 Drawing Sheets

(51) Int. Cl.
*H01L 21/00* (2006.01)
*G01J 5/00* (2006.01)
*G01J 5/08* (2006.01)
*G01J 5/12* (2006.01)
*G01J 5/20* (2006.01)
*G01J 5/52* (2006.01)

(56) References Cited

U.S. PATENT DOCUMENTS

| | | | |
|---|---|---|---|
| 5,308,161 A | 5/1994 | Stein | |
| 5,568,978 A * | 10/1996 | Johnson et al. | 374/161 |
| 5,809,211 A | 9/1998 | Anderson et al. | |
| 6,123,766 A | 9/2000 | Williams et al. | |
| 6,130,105 A * | 10/2000 | Redinbo et al. | 438/16 |
| 6,151,446 A | 11/2000 | Hunter et al. | |
| 6,191,399 B1 * | 2/2001 | Van Bilsen | 219/497 |
| 6,319,732 B1 | 11/2001 | Dils et al. | |
| 6,492,625 B1 * | 12/2002 | Boguslavskiy et al. | 219/486 |
| 6,561,694 B1 | 5/2003 | Lerch et al. | |
| 6,562,720 B2 | 5/2003 | Thilderkvist et al. | |
| 6,703,592 B2 * | 3/2004 | Van Bilsen | 219/497 |
| 6,876,442 B2 * | 4/2005 | Vatus et al. | 356/43 |
| 6,976,782 B1 * | 12/2005 | Steger | 374/1 |
| 7,003,417 B2 * | 2/2006 | Koukol et al. | 702/88 |
| 7,112,763 B2 | 9/2006 | Hunter et al. | |
| 7,262,116 B2 | 8/2007 | Singh et al. | |
| 7,419,299 B2 * | 9/2008 | Akram et al. | 374/137 |
| 7,572,052 B2 | 8/2009 | Ravi et al. | |
| 7,629,184 B2 * | 12/2009 | Kulp | 438/14 |
| 7,691,204 B2 | 4/2010 | Chacin et al. | |
| 7,734,439 B2 | 6/2010 | Timans | |
| 7,833,348 B2 * | 11/2010 | Wada et al. | 117/89 |
| 8,524,555 B2 * | 9/2013 | Sanchez et al. | 438/216 |
| 8,888,360 B2 * | 11/2014 | Gurary et al. | 374/2 |
| 2004/0164372 A1 * | 8/2004 | Akram et al. | 257/467 |
| 2006/0171442 A1 * | 8/2006 | Volf et al. | 374/1 |
| 2006/0190211 A1 * | 8/2006 | Schietinger et al. | 702/134 |
| 2007/0062439 A1 | 3/2007 | Wada et al. | |
| 2007/0291816 A1 * | 12/2007 | Volf et al. | 374/1 |
| 2008/0002753 A1 * | 1/2008 | Timans | 374/2 |
| 2009/0219969 A1 * | 9/2009 | Yamamoto | 374/29 |
| 2009/0276097 A1 | 11/2009 | Patalay et al. | |
| 2010/0054720 A1 | 3/2010 | Hunter et al. | |
| 2012/0170709 A1 * | 7/2012 | Fan et al. | 378/8 |

OTHER PUBLICATIONS

Two fast photodiodes for use in pulse radiolysis G.G. Teather et al. (Int. J. Radiat. Phys. Chem. 1976, vol. 8, pp. 477-481.

* cited by examiner

LOW TEMPERATURE MEASUREMENT AND CONTROL USING LOW TEMPERATURE PYROMETRY

CROSS-REFERENCE TO RELATED APPLICATIONS

This application claims benefit of U.S. provisional patent application Ser. No. 61/440,325, filed Feb. 7, 2011, which is herein incorporated by reference.

BACKGROUND OF THE INVENTION

1. Field of the Invention

Embodiments of the present invention generally relate to methods and apparatus for measuring, calibrating, and controlling substrate temperature during low temperature and high temperature processing. Particularly, the embodiments of the present invention relates to optical pyrometry and non-contact temperature measurement for low temperature applications.

2. Description of the Related Art

Epitaxial growth of silicon-containing films (e.g., Si, SiGe, SiC, or SiGeC, etc) has become increasingly important due to new applications for advanced logic and DRAM devices. A key requirement for these applications is a lower temperature process, so that device features will not be harmed during fabrication of the device. The lower temperature process is also important for future markets where high Ge % SiGe films or pure Ge films are desired. Lower process temperatures are required for both substrate cleaning prior to growth of the silicon-containing epitaxial film and during selective or blanket growth of the epitaxial film.

Shrinking feature size in semiconductor devices greatly increases the need for precise processing. One factor for precise processing is uniformity within a substrate and among substrates. It is critical to expose a substrate or a batch of substrates to a processing environment at a uniform temperature during process. Temperature uniformity is usually achieved by measuring temperatures in various locations in a batch chamber, and controlling the temperature according to measurements. Non contact temperature measuring methods, such as pyrometers, are accurate, repeatable and effective way to measure temperature of substrates in a semiconductor processing chamber.

Conventional optical pyrometers are able to reliably measure temperature of substrates in the range of 650-1200° C. for current high-temperature Epi (epitaxial) blanket processes and lower temperature selective-Si and SiGe processes. For future Epi technologies, the trend is for lower temperature processing in the range of 300-500° C. However, pyrometry integrated in the state of the art processing does not reliably measure the temperature of the substrate at lower temperatures (e.g., 300-500° C.). FIG. 1 shows performances of temperature tracking by different measuring approaches as a function of processing time. The graph illustrates the conventional radiation pyrometer (Std Pyro) has difficulties measuring temperatures lower than 420° C. This is because emission intensity from the wafer with the wavelength range to which the pyrometers are sensitive is insufficient for the conventional pyrometers to reliably measure lower temperatures. In addition, emissivity variation of the support plate and strong lamp radiation interference at lower temperatures also cause error in estimation of the substrate temperature due to poor signal/noise ratio, rendering process degradation, non-repeatability and drift.

Therefore, there is a need for apparatus and methods that can provide a repeatable, precise, and process-independent temperature measurement and control of the substrate in a wide temperature range of 300-1200° C.

SUMMARY OF THE INVENTION

Embodiments of the present invention generally relate to methods for measuring and controlling substrate temperature during low temperature and high temperature processing. In one embodiment, a method of processing a substrate in a processing chamber is provided. The method generally includes epitaxially forming a layer stack on a substrate placed on a support plate at a temperature range between about 300° C. and about 900° C., measuring a temperature of the substrate with a first pyrometer disposed over the substrate, measuring a temperature of the support plate with a second pyrometer disposed below the support plate, calibrating the first pyrometer at multiple temperature points based on actual temperature readings of the substrate to generate a first set of calibrated temperature readings associated with the substrate, calibrating the second pyrometer using the set of calibrated temperature readings as a reference to generate a second set of calibrated temperature readings associated with the support plate, and controlling a power supplied to a heat source configured to heat the substrate based on the second set of calibrated temperature readings.

In another embodiment, a method of controlling substrate temperature during substrate processing is provided. The method generally includes providing a set of reference temperature readings corresponding to actual temperature readings of a substrate during a deposition process, forming a first layer on the substrate in a deposition process chamber at a temperature range between about 300° C. and about 550° C., measuring a temperature of the substrate at a wavelength between about 2 and about 4.8 micrometers using a first optical monitoring device disposed above the substrate, measuring a temperature of a support plate on which the substrate is placed at a wavelength between about 2 and about 4.8 micrometers using a second optical monitoring device disposed below the support plate, calibrating the first optical monitoring device at multiple temperature points based on the set of reference temperature readings to provide a first set of calibrated temperature readings, calibrating the second optical monitoring device based on the first set of calibrated temperature readings to provide a second set of calibrated temperature readings, and controlling a power supplied to a heat source configured to heat the substrate based on the second set of calibrated temperature readings.

In yet another embodiment, a method of processing a substrate is provided. The method generally includes processing a substrate for a first period of time, comprising heating the substrate disposed on a support plate in a processing volume of a processing chamber to a temperature greater than about 600° C. using a plurality of lamps which are positioned to deliver electromagnetic energy to a first side of the support plate, measuring a temperature of the substrate at a wavelength between about 2 and 4.8 micrometers using a first optical monitoring device disposed over a first surface of the substrate, measuring a temperature of the support plate at a wavelength between about 2 and 4.8 micrometers using a second optical monitoring device positioned to view the first side of the support plate that is opposite to a second side of the support plate over which a second surface of the substrate is disposed, and controlling the temperature of the substrate while heating the substrate for the first period of time, wherein controlling the temperature comprises delivering a first amount of power to the plurality of lamps, adjusting the first amount of power delivered to the plurality of lamps using the measured temperature of the support plate or the measured temperature of the substrate, and processing a substrate for a second period of time, comprising heating the substrate disposed on the support plate to a temperature less than about 600° C. using the plurality of lamps, measuring a temperature of the substrate at a wavelength between about 2 and 4.8 micrometers using the first optical monitoring device, measuring a temperature of the support plate at a wavelength between about 2 and 4.8 micrometers using the second optical monitoring device, and controlling the temperature of the substrate while heating the substrate for the second period of time, wherein controlling the temperature comprises delivering a second amount of power to the plurality of lamps, and adjusting the second amount of power delivered to the plurality of lamps using the measured temperature of the support plate or the measured temperature of the substrate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to methods for measuring and controlling substrate temperature during low temperature and/or high temperature processing. Specifically, the present invention provides a stable closed-loop temperature control of a substrate in a wide range of 300-1200° C. by calibrating the pyrometers at multiple temperature points using a polynomial (least-squares) curve fitting or a linear curve fitting approach to compensate for emissivity variation of the substrate and/or support plate.

In one embodiment, the method generally includes epitaxially forming a layer stack on a substrate placed on a support plate at a temperature range between about 300° C. and about 900° C., measuring a temperature of the substrate with a first pyrometer disposed over the substrate, measuring a temperature of the support plate with a second pyrometer disposed below the support plate, calibrating the first pyrometer at multiple temperature points based on actual temperature readings of the substrate to generate a first set of calibrated temperature readings associated with the substrate, calibrating the second pyrometer using the set of calibrated temperature readings as a reference to generate a second set of calibrated temperature readings associated with the support plate, and controlling a power supplied to a heat source configured to heat the substrate based on the second set of calibrated temperature readings.

In one example, the layer stack has a graded $Si_xGe_{1-x}$ layer (where x is in the range from 0 to 1) deposited over a Ge-containing layer. The first pyrometer may be calibrated using a polynomial curve fit or multi-linear fit method at multiple temperature points within a range between about 300° C. and about 900° C. The temperature of the substrate and the support plate may be measured at a wavelength between about 2 and about 4.8 micrometers using a highly sensitive photodetector such as InAs, InGaAs, or PbS diode photodetectors.

Exemplary Hardware

Figure 2:
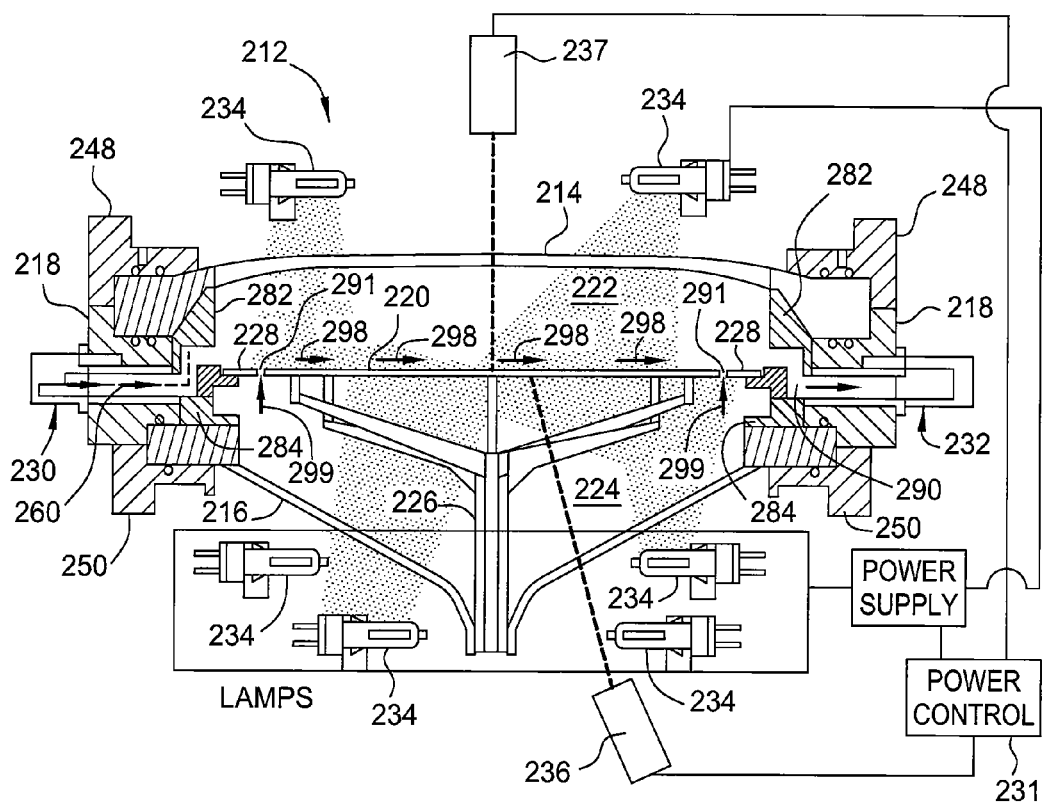
FIG. 2 is a schematic, cross-sectional view of a semiconductor processing chamber used for carrying out methods of the invention.

Embodiments disclosed herein may be practiced in the Applied CENTURA® RP Epi chamber, available from Applied Materials, Inc. of Santa Clara, Calif. The Epi chamber as shown in FIG. 2 may be employed as part of a CENTURA® Integrated Processing System, which is a fully automated semiconductor fabrication system, employing a single-wafer, multi-chamber, modular design which accommodates 200-mm or 300-mm wafers. Particular features of this apparatus related to the present invention are described in detail below; however, it is contemplated that other apparatus, including those from other manufacturers known in the industry, may also benefit from embodiments disclosed herein for the epitaxial growth of films.

FIG. 2 shows a schematic cross-sectional view of an exemplary deposition chamber 212 for practicing methods in accordance with the invention. The deposition chamber 212 generally includes an upper dome 214, a lower dome 216 and a sidewall 218 between the upper and lower domes 214 and 216. Cooling fluid (not shown) may be circulated through sidewall 218 to cool chamber components such as o-rings (not shown) used to seal domes 214 and 216 against sidewall 218. An upper liner 282 and a lower liner 284 are mounted against the inside surface of sidewall 218. The upper and lower domes 214 and 216 are made of a transparent material, such as high-purity quartz, to allow heating light to pass through into the deposition chamber 212. If desired, reflectors (not shown) may be used to help control the deposition chamber 212 exposure to the radiant energy provided by lamps 234.

Within the deposition chamber 212 is a flat, circular support plate 220 for supporting a substrate (not shown) in a horizontal position. The support plate 220 can be any other substrate supporting structure and extends transversely across the chamber 212 at the sidewall 218 to divide the chamber 212 into an upper portion 222 above the support plate 220 and a lower portion 224 below the support plate 220. The support plate 220 is mounted on a shaft 226 which extends perpendicularly downward from the center of the bottom of the support plate 220. The shaft 226 is connected to a motor (not shown) which rotates shaft 226 and thereby rotates the support plate 220. An annular preheat ring 228 is connected at its outer periphery to the inside periphery of lower liner 284 and extends around the support plate 220. The preheat ring 228 occupies nearly the same plane as the support plate 220 with the inner edge of the preheat ring 228 separated by a gap from the outer edge of the support plate 220.

An inlet manifold 230 is positioned in the sidewall 218 of deposition chamber 212 and is adapted to admit gas from a source (not shown) of gas or gases into the chamber 212. The flow of gases are generally independently controlled with manual valves (not shown) and computer (not shown). An outlet port 232 is positioned in the side of chamber 212 diametrically opposite the inlet manifold 230 and is adapted to exhaust gases from the deposition chamber 212.

A plurality of high intensity lamps 234 are mounted around the deposition chamber 212 and direct their light through the upper and lower domes 214, 216 onto the support plate 220 (and preheat ring 228) to heat the support plate 220 (and preheat ring 228). Support plate 220 and preheat ring 228 may be made of a highly emissive material, such as silicon carbide, coated graphite which is opaque to the radiation emitted from lamps 234 so that they can be heated by radiation from lamps 234. As mentioned above, the upper and lower domes 214, 216 are made of a material which is transparent to the light from the lamps 234, such as clear quartz. The upper and lower domes 214, 216 are generally made of quartz because quartz is transparent to light of both visible and IR frequencies; it exhibits a relatively high structural strength and is chemically stable in the process environment of the deposition chamber 212. Although lamps 234 are illustrated and discussed for heating substrates in deposition chamber 212, other heating methods may be used such as resistance heaters and RF inductive heaters. In one embodiment, the lamps 234 include four lamps being controlled in radially arranged zones. For example, four zones may be provided in which two upper and lower heat sources may point near the substrate center and near the transition from the substrate to the edge (adjacent to the preheat ring), respectively, with or without partially overlapping with one another, thereby providing a more tailored radial thermal profile to account for thermal edge effects.

A bottom pyrometer 236 is mounted below the lower dome 216 and faces the bottom surface of the support plate 220 through the lower dome 216. The bottom pyrometer 236 is used to monitor the temperature of the support plate 220 by receiving infrared radiation emitted from the support plate 220. The infrared radiation tends to increase when a temperature of the support plate 220 increases, and decrease when the temperature of the support plate 220 decreases. The bottom pyrometer 236 generates a signal in response to the infrared radiation. Similarly, an upper pyrometer 237 is disposed above the upper dome 214 and faces the upper surface of a substrate placed on the support plate 220 for measuring the temperature of the substrate. The upper pyrometer 237 is used to receive infrared radiation emitted from the substrate or the layer formed on the substrate. The upper pyrometer 237 generates a signal in response to the infrared radiation. The signal increases when a magnitude of the infrared radiation increases, and decreases when a magnitude of the infrared radiation decreases. Although only two pyrometers are shown in FIG. 2, it is contemplated that any number of pyrometers or the lamps necessary to control and uniformly provide a desired temperature profile across the substrate may also be used.

An upper clamping ring 248 extends around the periphery of the outer surface of the upper dome 214. A lower clamping ring 250 extends around the periphery of the outer surface of the lower dome 216. The upper and lower clamping rings 248 and 250 are secured together so as to clamp the upper and lower domes 214 and 216 to the sidewall 218.

According to the present invention, process gas or gases 298 are fed into the upper chamber portion 222 from gas inlet manifold 230. A process gas, according to the present invention, is defined as a gas or gas mixture which acts to remove, treat, or deposit a film on a substrate placed in the deposition chamber 212. In an embodiment of the present invention a process gas is used to deposit a silicon-containing epitaxial layer on a substrate placed on support plate 220. The flow of process gas 298 is essentially a laminar flow from an inlet passage 260, across preheat ring 228, across support plate 220 (and the substrate, not shown), across the opposite side of preheat ring 228, and an exhaust passage 290. The process gas is heated to a deposition or process temperature by the preheat ring 228, support plate 220, and the substrate being processed.

While the process gas or gas mixture is fed into the upper chamber portion 222, an inert purge gas or gases (not shown) may be fed independently into the lower chamber portion 224. The inert purge gas can be heated by the preheat ring 228 and support plate 220 to essentially the same temperature as the process gas while in the deposition chamber 212. An inert purge gas 299 may be fed into the lower chamber portion 224 at a rate which develops a positive pressure within lower chamber portion 224 with respect to the process gas pressure in the upper chamber portion 222. Process gas 298 is therefore prevented from seeping down through gap 291 and into the lower chamber portion 224, and depositing on the backside of support plate 220.

Highly Sensitive Photo-Detector

To reliably and repeatably measure temperature in the lower temperature range of about 300° C. to about 600° C., in one embodiment of the present invention the upper pyrometer 237 as described above may be implemented with a photodetector that has very high sensitivity (e.g., >0.1 A/W) in the wavelength range of 2-4.8 μm. An example of such a detector is an InAs diode photodetector, which has a detection band of between about 1-3.8 μm wavelength range. The InAs diode photodetector can be optically filtered with a narrow-pass filter which passes only such radiation as falls within the selected spectral band (e.g., wavelengths between about 3-3.5 μm) to minimize the influence of stray-light radiation at short wavelengths. The narrow-pass filter will help passing mostly radiation having a wavelength less than the band gap wavelength of the substrate at the highest temperature measured by the upper pyrometer 237 and cutting off most of the Planckian spectrum above this band gap wavelength. In one example, the InAs diode photodetector has very high sensitivity in the wavelength of 3.3 μm CWL (center wave length) at 200 nm FWHM (full width half maximum). If desired, the optical filtering of the InAs diode photodetector can be shifted to longer wavelength within the allowable limit of the photodetector to increase the sensitivity at lower temperatures. In certain embodiments where the substrate temperature is higher (e.g., above 350° C.), it may be desired to use an InGaAs or PbS diode photodetector that is sensitive to wavelengths between about 0.9 and 2.8 μm.

In various embodiments, the viewing optics of the InAs diode photodetector used in the upper and bottom pyrometers 237, 236 can be designed to collect infrared radiation from the target (i.e., the substrate or support plate) from a broader area, thus increasing the amount of signal at lower temperatures. For example, the spot-size of the InAs diode photodetector can be increased from 5 mm up to about 25 mm in diameter, which is believed to increase the sensitivity of the InAs diode photodetector at low temperature by an order of magnitude.

In one example, the spot-size of the InAs diode photodetector is about 8 mm in diameter at a focal distance of about 432 mm.

While the InAs diode photodetector described herein is particular useful at lower temperatures, the InAs diode photodetector can provide improved sensitivity and high resolution throughout a great temperature range between 600° C. and 1200° C. when used in conjunction with multi-point temperature calibration and temperature control technique, as will be described below. The InAs diode photodetector has sensitivity about 100-1000 times higher than the conventional pyrometers using a thermo-pile based sensor that has poor sensitivity and response. If desired, such sensitive mid-IR photodetectors that tend to drift with ambient temperature can be thermo-electrically cooled to reduce noise and improve low temperature sensitivity and drift. To further improve the sensitivity at low temperature, the reading outputs of the upper and bottom pyrometers 237, 236 can be connected to an external Analog to Digital (A/D) converter (not shown), which converts and digitizes the temperature information into an 12-bit or higher value, such as 16-bit or 24-bit, to provide linear temperature digital output with much higher resolution, low noise and interference at lower temperatures. A programmable gain amplifier (not shown) can also be implemented between the sensors and the A/D converter to amplify the output, enabling use of the full A/D converter resolution with any realistic electrode output.

Multi-Point Calibration and Temperature Control

As mentioned above, pyrometers integrated in the state of the art processing chambers suffers from fundamental limitations due to its inability to accurately measure temperature below 500° C. In addition, emissivity variation of the substrate and strong lamp radiation interference at low temperatures cause variations in the infrared radiation detected by the upper pyrometer, which in turn affects the bottom pyrometer since it provides signals to a power controller for actual temperature control of the support plate. In order to obtain good recipe control from low to high temperature transition (e.g., 300° C.-1200° C.) and reliably and repeatably measure temperature of the substrate, the upper and bottom pyrometers can be calibrated at multiple temperature points using the method of the present invention as illustrated in FIG. 3.

Figure 3:
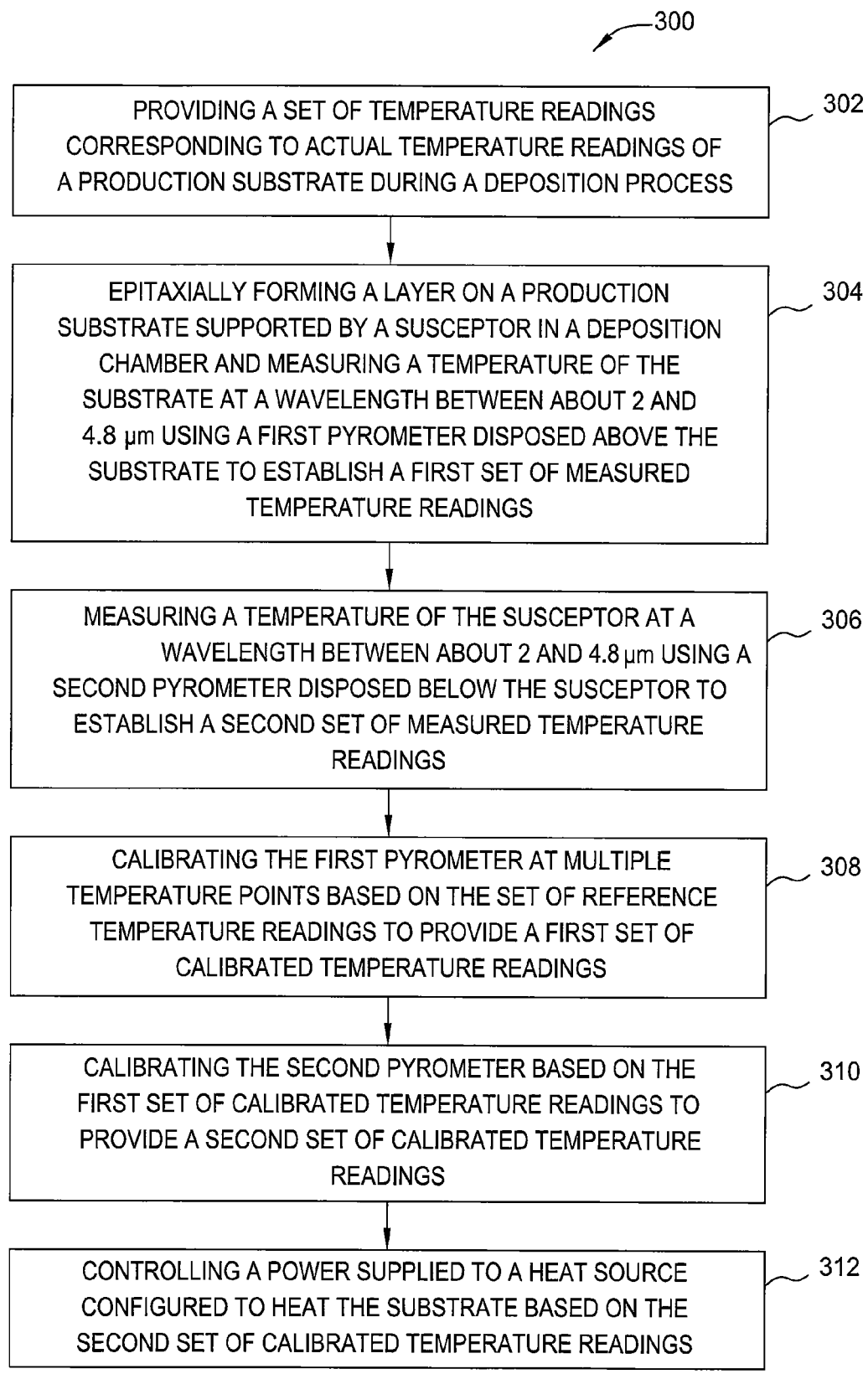
FIG. 3 is a simplified block diagram of an exemplary method for calibrating pyrometers and controlling substrate temperature within a deposition chamber in accordance with one embodiment of the present invention.

FIG. 3 illustrates a simplified block diagram of an exemplary method for calibrating pyrometers and controlling substrate temperature within a deposition chamber in accordance with one embodiment of the present invention. The method 300 may be performed using the deposition chamber 212 as illustrated in FIG. 2 or any deposition chambers manufactured by other manufacturers. It should be understood that the number, order and sequence of blocks illustrated in FIG. 3 are not intended to limiting as to the scope of the invention described herein, since one or more blocks/steps can be added, deleted and/or reordered without deviating from the basic scope of the invention described herein.

In block 302, a calibrated substrate is used in a calibration process to simulate or establish a set of reference temperature readings corresponding to actual temperature readings of a production substrate during a deposition process. Typically, the calibrated substrate is placed on a support plate in a process chamber, for example, the deposition chamber 212 as illustrated in FIG. 2, and undergoes temperature cycling from low temperature to high temperature (e.g., 300° C. to 1200° C.) as for a production substrate, but not actual processing. Specifically, the set of reference temperature readings acquired during the calibration process substantially corresponds to actual temperature readings of the production substrate as if the calibrated substrate was undergoing an actual deposition process. The calibrated substrate, which can be purchased from commercial sources, has a previously measured, known emissivity and it has an "embedded" thermocouple which is attached to the upper surface of the substrate. When the calibrated substrate is heated, its actual temperature readings are indicated by the thermocouple. Since the substrate's emissivity is known, the radiation that is actually emitted by the substrate can be easily calculated by multiplying the intensity of radiation that would be expected from by an ideal black body that is at the predetermined temperature times the emissivity of the substrate.

In block 304, a layer is epitaxially grown on a production substrate supported by a support plate in a deposition chamber and the temperature of the production substrate is measured by a first pyrometer to establish a first set of measured temperature readings. The temperature measurement can be made continuously or at predetermined intervals. The temperature of the production substrate may be measured by the first pyrometer at a wavelength between about 2 and 4.8 μm, for example, about 3 and 3.5 μm. The first pyrometer can be a highly sensitive photodetector, such as the InAs, InGaAs, or PbS diode photodetector as discussed above. The first pyrometer can be an upper pyrometer 237 disposed above the upper dome 214 of the deposition chamber 212 (FIG. 2) and faces the upper surface of the production substrate for measuring the infrared radiation emitted from the production substrate.

Figure 1:
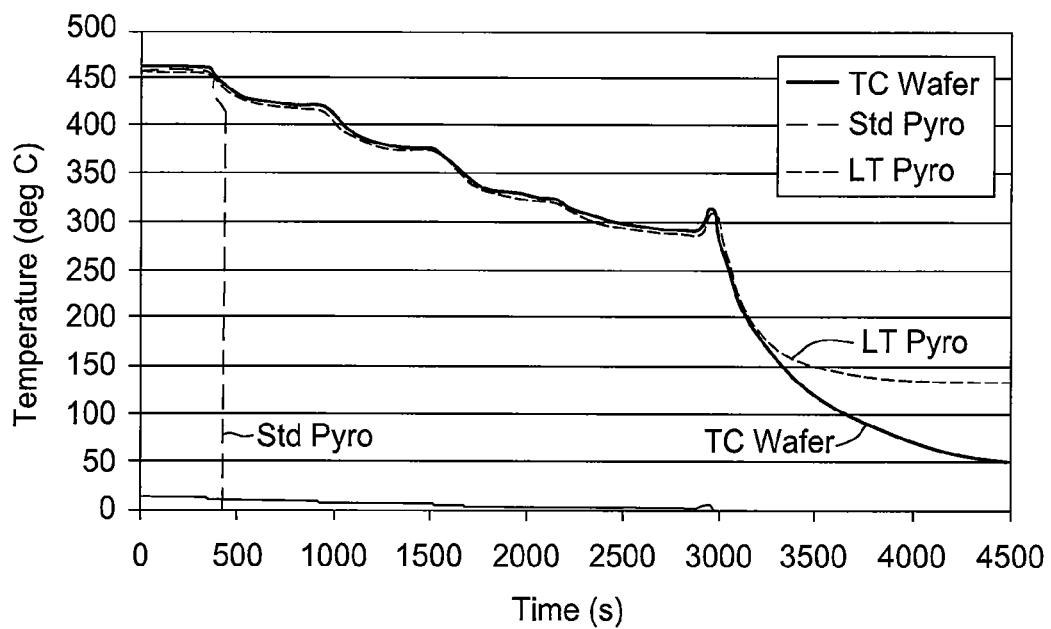
FIG. 1 is a graph showing performances of temperature tracking by different measuring approaches as a function of processing time.
Figure 4:
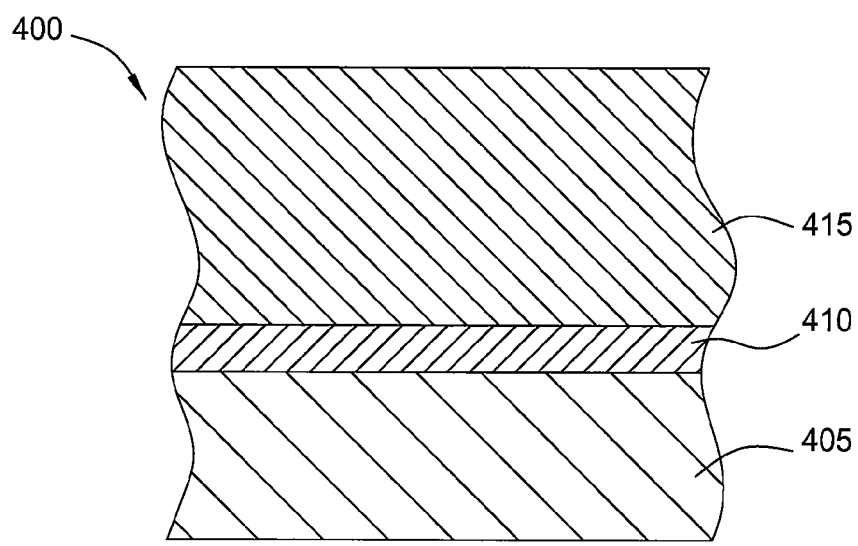
FIG. 4 is a schematic cross-sectional view of an exemplary production substrate used for epitaxial SiGe depositions.
Figure 5:
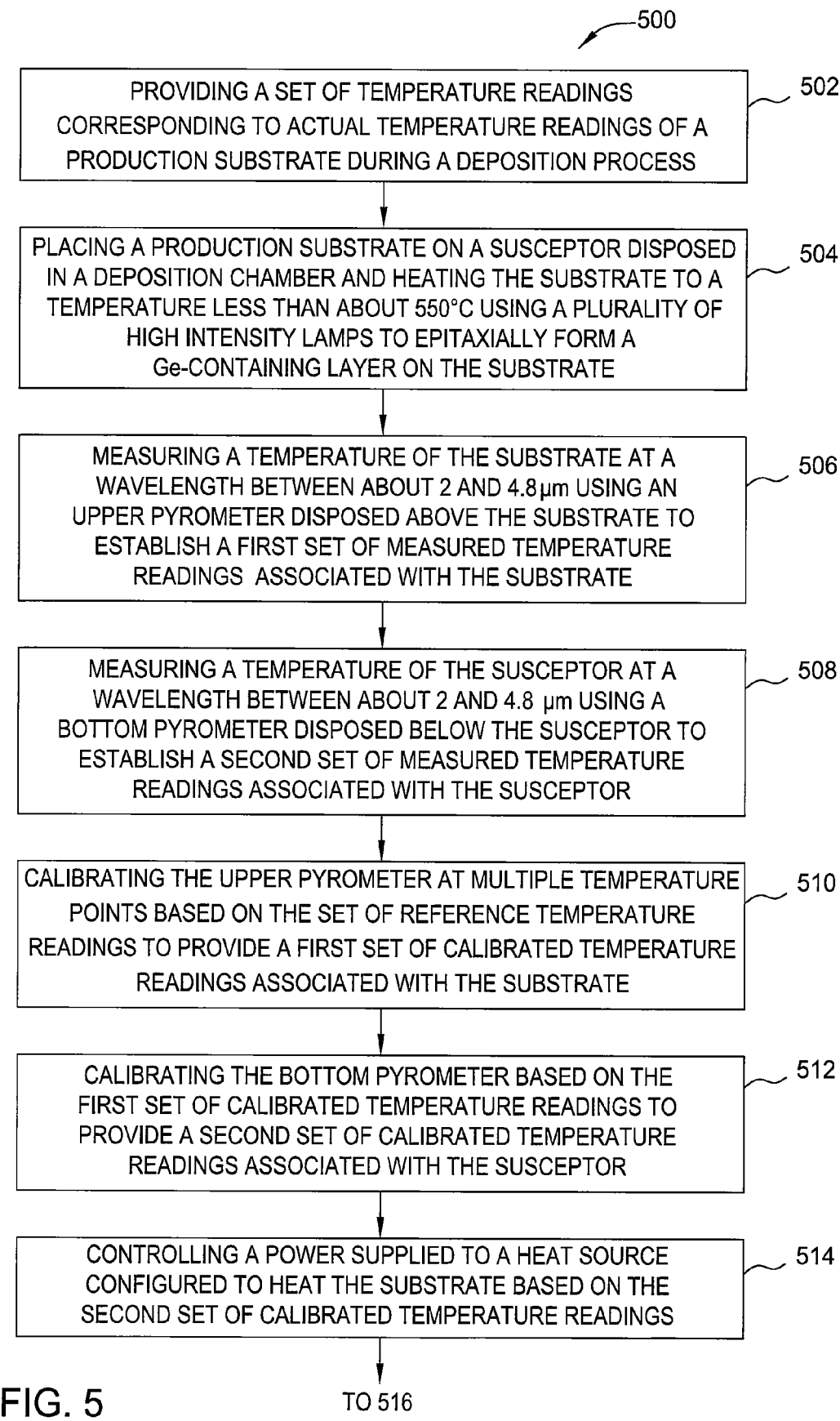
FIG. 5 is a simplified block diagram of an exemplary method for calibrating pyrometers and controlling temperature of the production substrate within a deposition chamber in accordance with another embodiment of the present invention.
Figure 5:
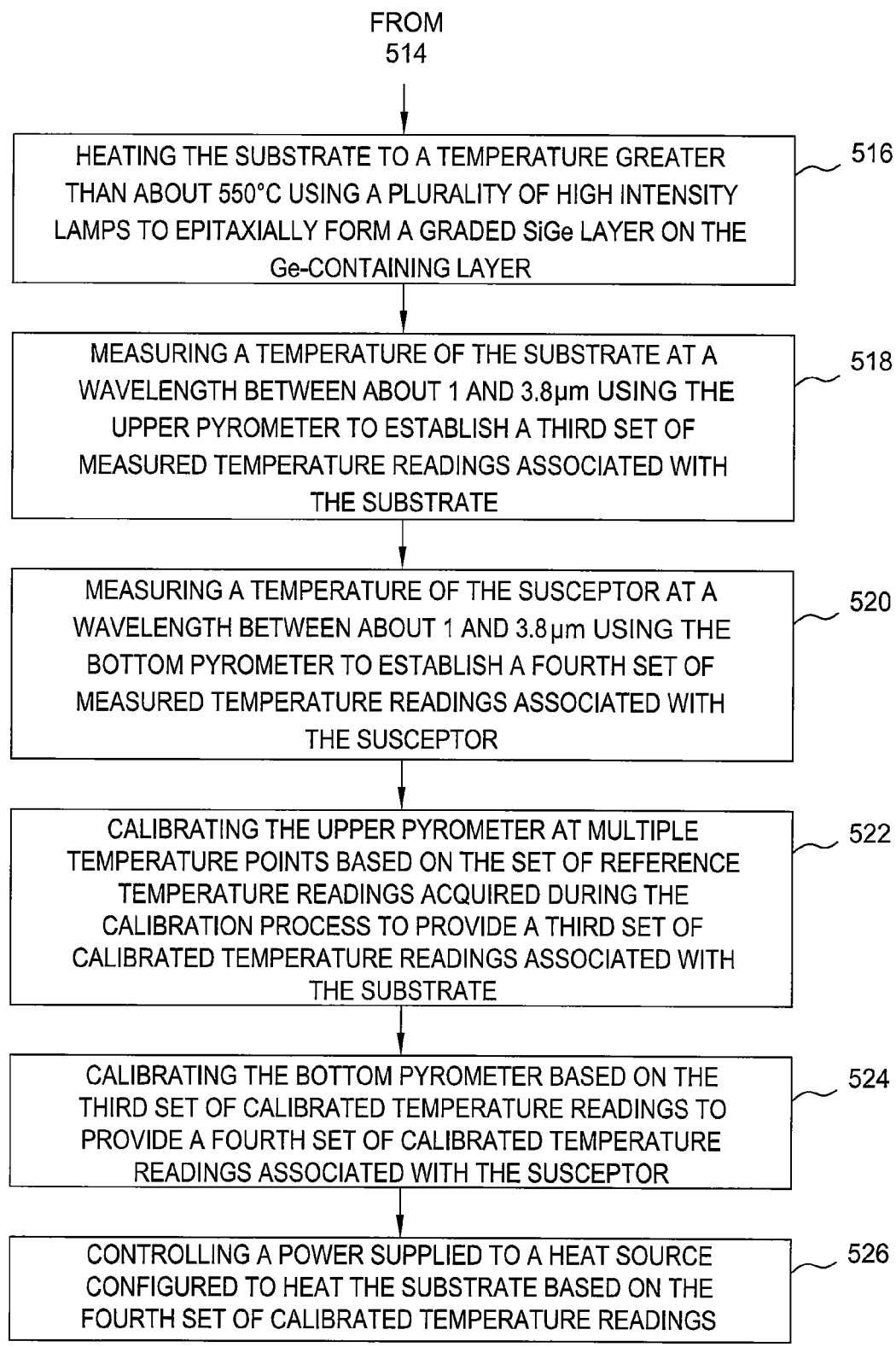

While the process of the present invention is described for depositing an epitaxial layer, the layer to be deposited on the substrate need not necessarily be an epitaxial layer and can be for example monocrystalline, polycrystalline, or amorphous layer. The production substrate may be heated to a desired temperature, depending upon the process and the layer to be deposited. For example, the layer can be a composite layer formed by a combination of silicon, silicon carbide, gallium nitride, gallium arsenide, silicon-germanium ($Si_xGe_{1-x}$), silicon-germanium-carbon ($Si_xGe_yC_{1-x-y}$), or other crystalline semiconductor materials. The layer can be doped with impurities such as but not limited to arsenic, phosphorus, and boron or can be undoped if desired. An example of Ge/SiGe deposition using pyrometer calibration and temperature control is illustrated in FIGS. 4 and 5 and will be discussed in detail below.

In block 306, the temperature of the support plate is measured by a second pyrometer to establish a second set of measured temperature readings. The temperature measurement can be made continuously or at predetermined intervals. The temperature measurement of the support plate may be separately or concurrently with the temperature measurement of the production substrate. In one embodiment, the temperature of the support plate is measured by the second pyrometer at a wavelength between about 2 and 4.8 μm, for example, about 3 and 3.5 μm. The second pyrometer can be a highly sensitive photodetector, such as the InAs, InGaAs, or PbS diode photodetector as discussed above. The second pyrometer can be a bottom pyrometer 236 mounted below the lower dome 216 and faces the bottom surface of the support plate 220 through the lower dome 216 (FIG. 2). The second pyrometer is used to monitor the temperature of the support plate 220 by receiving infrared radiation emitted from the support plate 220.

In block 308, the first pyrometer is calibrated at multiple temperature points based on the actual substrate temperature previously obtained from the calibrated substrate during the calibration process. Specifically, the first set of measured temperature readings taken from the production substrate are curve fitted with the set of reference temperature readings obtained from the calibrated substrate at multiple temperature points by a computational method to calibrate out any non-linear discrepancies due to emissivity variation of the substrate and strong lamp radiation interference occurred at low temperatures as discussed above. The calibrated first pyrometer then generates a first set of calibrated temperature readings that matches or substantially corresponds to actual temperature readings of the production substrate. Alternatively, the calibration of the first pyrometer may be performed continuously without any interrupt.

The computational method used for calibration can be any well-known calibration techniques such as polynomial curve fitting, multi-linear fitting, best-fit curve, or averaging process that is capable of non-linear fitting or matching the first set of measured temperature readings and the set of reference temperature readings over a wide temperature range. Depending upon the deposition process, the first pyrometer may be calibrated at multiple temperature points within a desired processing temperature range. For example, the upper pyrometer may be calibrated tracking the set of reference temperature readings at 200° C., 300° C., 400° C., and 500° C., respectively, if a low temperature deposition were performed. It is understood that the calibration temperature points as described herein are solely for illustrative purposes and should not be considered as a limitation. For example, the upper pyrometer may be calibrated tracking the set of reference temperature readings at 350° C., 450° C., 550° C., and 650° C., respectively. Alternatively, the upper pyrometer may be calibrated at multiple temperature points in a wide temperature range of about 300° C. to about 1200° C. The calibration temperature points are customized and can be adapted at any desired time intervals, depending upon the process scheme.

In block 310, the second pyrometer is calibrated using the first set of calibrated temperature readings as a reference. Specifically, the second set of measured temperature readings previously taken from the support plate are curve fitted with the first set of calibrated temperature readings obtained from the calibrated first pyrometer by a computation method to calibrate out any non-linear discrepancies due to emissivity variation of the support plate and strong lamp radiation interference occurred at low temperatures as discussed above. The calibrated second pyrometer then generates a second set of calibrated temperature readings that substantially corresponds to actual temperature readings of the support plate. Once actual temperature readings of the support plate is known, the lamps used for heating the substrate can be precisely controlled at a desired temperature. The second pyrometer may be calibrated continuously while the first pyrometer is calibrated or at predetermined intervals. If desired, the second pyrometer may be calibrated immediately after each calibration of the first pyrometer is finished, that is, the second pyrometer can be calibrated at multiple temperature points. Similarly, the computational method used for calibration can be any well-known calibration techniques such as polynomial curve fitting, multi-linear fitting, best-fit curve, or averaging process that is capable of non-linear fitting or matching the second set of measured temperature readings obtained from the support plate and the first set of calibrated temperature readings obtained from the calibrated first pyrometer over a wide temperature range.

In block 312, the second set of calibrated temperature readings obtained from the calibrated second pyrometer is provided to a power controller 231. The power controller 231 then uses the second set of calibrated temperature readings that corresponds to actual temperature readings of the support plate to control the amount of power supplied to heat sources (i.e., lamps 234) configured to heat the substrate from below the support plate and control the substrate at a desired temperature. In certain embodiments, the power controller 231 may instead use the first set of calibrated temperature readings associated with the substrate to control the amount of power supplied to heat sources configured to heat the substrate at a desired temperature.

In order to improve the temperature control repeatability, in certain embodiments the power controller 231 may be controlled by a Proportional Integrated Derivative (PID) algorithm to ramp the power provided to the support plate to a desired temperature based on the calibrated temperature of the support plate. The PID control may be optimized for low and high temperature range and the PID gains may be dynamically scheduled for the power controller 231 based on the measured temperature range of the support plate. By optimizing the PID gains, stable closed-loop temperature control is achieved in a wide temperature range between 300-900° C. with good run to run repeatability of substrate temperature.

It is contemplated that methods described herein are examples of calibrating the pyrometers. Other variations are possible for accurately calibration of the pyrometers. For example in certain embodiments, after block 308, the second set of measured temperature readings taken previously from the support plate may be compared with the set of reference temperature readings previously obtained from the calibrated substrate at multiple temperature points. The power provided to lamps used to heat the substrate and/or support plate is then adjusted based on the comparison to control the temperature of the substrate at a desired temperature. Alternatively, the second set of measured temperature readings taken from the support plate may be curve fitted with the set of reference temperature readings obtained from the calibrated substrate at multiple temperature points by a computational method to calibrate out any non-linear discrepancies. Depending upon the deposition process, the first and second pyrometers may be calibrated along with the first pyrometer at multiple temperature points in a wide temperature range between about 200-500° C., 300-800° C., 300-1200° C., or any desired temperature range.

FIG. 4 shows a schematic cross-sectional view of an exemplary production substrate used for epitaxial SiGe depositions. The production substrate 400 generally includes a single crystal Si substrate 405 (e.g., epitaxial Si layer or single crystal Si substrate surface). A thin epitaxial Ge-containing layer 410 is deposited on the single crystal Si structure 405, and a $Si_xGe_{1-x}$ layer 415 (where x is in the range from 0 to 1) is deposited on the epitaxial Ge-containing layer 410. In one embodiment, the epitaxial Ge-containing layer 410 has a high Ge content such as at 50 at. % to 100 at. %, particularly pure Ge. The $Si_xGe_{1-x}$ layer 415 may be a graded $Si_xGe_{1-x}$ layer in which the value of x decreases in an upward direction within the layer. FIG. 5 illustrates a simplified block diagram of a method 500 for calibrating pyrometers and controlling temperature of the production substrate 400 within a deposition chamber in accordance with another embodiment of the present invention. In this embodiment, a silicon-containing substrate on which a pure Ge layer and a graded SiGe layer are sequentially deposited is provided. It should be understood that the number, order and sequence of blocks illustrated in FIG. 5 are not intended to limiting as to the scope of the invention described herein, since one or more blocks/steps can be added, deleted and/or reordered without deviating from the basic scope of the invention described herein.

In addition, it should be noted that the Ge/SiGe growth as discussed herein is solely provided for illustrative purposes and the present invention should not be limited to any specific deposition. As previously discussed, all that are needed for measuring, calibrating, and controlling substrate temperature during low temperature and high temperature processing is a substrate of a known emissivity and a set of reference temperature readings either of the substrate or the supple plate for the upper and bottom pyrometers.

In block 502, a calibrated substrate is used in a calibration process to simulate or establish a set of reference temperature readings in a wide range between, for example, about 200-900° C., which simulates or corresponds to actual temperature readings of a production substrate during a deposition process. In this embodiment, the set of reference temperature readings acquired during the calibration process corresponds to actual temperature readings of the substrate 405, for example, in a SiGe deposition process.

In block 504, the substrate 405 is placed on a support plate disposed in the deposition chamber and heated to a temperature less than about 550° C., for example, between about 200-550° C., using a plurality of high intensity lamps mounted around the deposition chamber, to epitaxially form a first layer, for example, a Ge-containing layer 410, on the substrate 405.

In block 506, the temperature of the substrate 405 is measured by an upper pyrometer to establish a first set of measured temperature readings associated with the substrate 405. In one aspect, the temperature measurement is made continuously or at predetermined intervals between about 300° C. and about 550° C. The temperature of the substrate 405 is measured by the upper pyrometer at a wavelength between about 2 and 4.8 μm, for example, about 3 and 3.5 μm. The upper pyrometer can be a highly sensitive photodetector, such as the InAs, InGaAs, or PbS diode photodetector. The upper pyrometer is disposed above an upper dome of the deposition chamber and faces an upper surface of the substrate 405 for measuring the infrared radiation emitted from the substrate 405.

In block 508, the temperature of the support plate is measured by a bottom pyrometer to establish a second set of measured temperature readings associated with the support plate. The temperature measurement can be made continuously or at predetermined intervals. The temperature measurement of the support plate may be separately or concurrently with the temperature measurement of the substrate 405. In one embodiment, the temperature of the support plate is measured by the bottom pyrometer at a wavelength between about 2 and 4.8 μm, for example, about 3 and 3.5 μm. The bottom pyrometer can be a highly sensitive photodetector, such as the InAs, InGaAs, or PbS diode photodetector. The bottom pyrometer is mounted below a lower dome and faces a bottom surface of the support plate through the lower dome.

In block 510, the upper pyrometer is calibrated at multiple temperature points based on the set of reference temperature readings previously obtained from the calibrated substrate during the calibration process to provide a first set of calibrated temperature readings associated with the substrate. Specifically, the first set of measured temperature readings taken from the substrate 405 are curve fitted with the set of reference temperature readings at multiple temperature points by a computational method to calibrate out any non-linear discrepancies. The computational method used for calibration can be any well-known calibration techniques such as polynomial curve fitting, multi-linear fitting, best-fit curve, or averaging process that is capable of non-linear fitting or matching the first set of measured temperature readings and set of reference temperature readings over a desired temperature range. In one embodiment, the upper pyrometer is calibrated tracking the set of reference temperature readings at, for example, 200° C., 300° C., 400° C., and 500° C., respectively. Any other temperature range may be adapted. The calibrated upper pyrometer then generates a first set of calibrated temperature readings that matches or substantially corresponds to actual temperature readings of the substrate 405. The upper pyrometer may be calibrated tracking the set of reference temperature readings at any other temperature points. If desired, the calibration of the upper pyrometer may be performed continuously without any interrupt.

In block 512, the bottom pyrometer is calibrated using the first set of calibrated temperature readings as a reference to provide a second set of calibrated temperature readings associated with the support plate. Specifically, the second set of measured temperature readings previously taken from the support plate are curve fitted with the first set of calibrated temperature readings obtained from the calibrated upper pyrometer by a computation method to calibrate out any non-linear discrepancies. The calibrated bottom pyrometer then generates a second set of calibrated temperature readings that substantially corresponds to actual temperature readings of the support plate. The bottom pyrometer may be calibrated continuously while the upper pyrometer is calibrated or at predetermined intervals. If desired, the bottom pyrometer may be calibrated immediately after each calibration of the upper pyrometer is finished, that is, the second pyrometer can also be calibrated at multiple temperature points. Similarly, the computational method used for calibration can be any well-known calibration techniques such as polynomial curve fitting, multi-linear fitting, best-fit curve, or averaging process that is capable of non-linear fitting or matching the second set of measured temperature readings obtained from the support plate and the first set of calibrated temperature readings obtained from the calibrated upper pyrometer over a desired temperature range.

In block 514, the second set of calibrated temperature readings obtained from the calibrated bottom pyrometer is provided to a power controller 231. The power controller 231 then uses the second set of calibrated temperature readings that corresponds to actual temperature readings of the support plate to control the amount of power supplied to heat sources (e.g., lamps) configured to heat the substrate from below the support plate or control the substrate at a desired temperature for, for example, Ge-containing layer deposition.

In block 516, the substrate 405 is heated to a temperature greater than about 550° C., for example, between about 550-1050° C., using a plurality of high intensity lamps mounted around the deposition chamber, to form a second layer, for example, a graded SiGe layer 415, on the first layer, for example, Ge-containing layer 410.

In block 518, the temperature of the substrate 405 is measured by the upper pyrometer to establish a third set of measured temperature readings associated with the substrate 405. In one aspect, the temperature measurement is made continuously or at predetermined intervals between about 450° C. and about 900° C. The temperature of the substrate 405 is measured by the upper pyrometer at a wavelength between about 1 and 3.8 μm.

In block 520, the temperature of the support plate is measured by the bottom pyrometer to establish a fourth set of measured temperature readings associated with the support plate. The temperature of the support plate is measured by the bottom pyrometer at a wavelength between about 1 and 3.8 pm. The temperature measurement can be made in a similar fashion as discussed above in conjunction with block 508.

In block 522, the upper pyrometer is calibrated at multiple temperature points based on the set of reference temperature readings previously obtained from the calibrated substrate during the calibration process. Specifically, the third set of measured temperature readings taken from the substrate 405 are curve fitted with the set of reference temperature readings at multiple temperature points by the similar fitting method as discussed above in conjunction with block 510 to calibrate out any non-linear discrepancies. In one embodiment, the upper pyrometer is calibrated tracking the set of reference temperature readings at, for example, 550° C., 650° C., 750° C., and 850° C., respectively. Any other temperature range may be adapted. The upper pyrometer may be calibrated tracking the set of reference temperature readings at any other desired temperature points. The calibrated upper pyrometer then generates a third set of calibrated temperature readings that matches or substantially corresponds to actual temperature readings of the substrate 405. If desired, the calibration of the upper pyrometer may be performed continuously without any interrupt.

In block 524, the bottom pyrometer is calibrated using the third set of calibrated temperature readings as a reference. Specifically, the fourth set of measured temperature readings previously taken from the support plate are curve fitted with the third set of calibrated temperature readings obtained from the calibrated upper pyrometer in a similar fitting method as discussed above in conjunction with block 510 to calibrate out any non-linear discrepancies. The calibrated bottom pyrometer then generates a fourth set of calibrated temperature readings that substantially corresponds to actual temperature readings of the support plate. The bottom pyrometer may be calibrated continuously while the upper pyrometer is calibrated or at predetermined intervals. If desired, the bottom pyrometer may be calibrated immediately after each calibration of the upper pyrometer is finished, that is, the second pyrometer can also be calibrated at multiple temperature points.

In block 526, the fourth set of calibrated temperature readings obtained from the calibrated bottom pyrometer is provided to a power controller 231. The power controller 231 then uses the fourth set of calibrated temperature readings that corresponds to actual temperature readings of the support plate to control the amount of power supplied to heat sources (e.g., lamps) configured to heat the substrate from below the support plate or control the substrate at a desired temperature for graded SiGe layer deposition. In order to optimize the temperature control repeatability, in certain embodiments the power controller 231 may be controlled by a Proportional Integrated Derivative (PID) algorithm to ramp the power provided to the support plate to a desired temperature based on the calibrated temperature of the support plate. The PID control may be optimized for low and high temperature range and the PID gains may be dynamically scheduled for the power controller 231 based on the measured temperature range of the support plate. By optimizing the PID gains, stable closed-loop temperature control is achieved in a wide temperature range between 300-900° C. with good run to run repeatability of substrate temperature.

Figure 6:
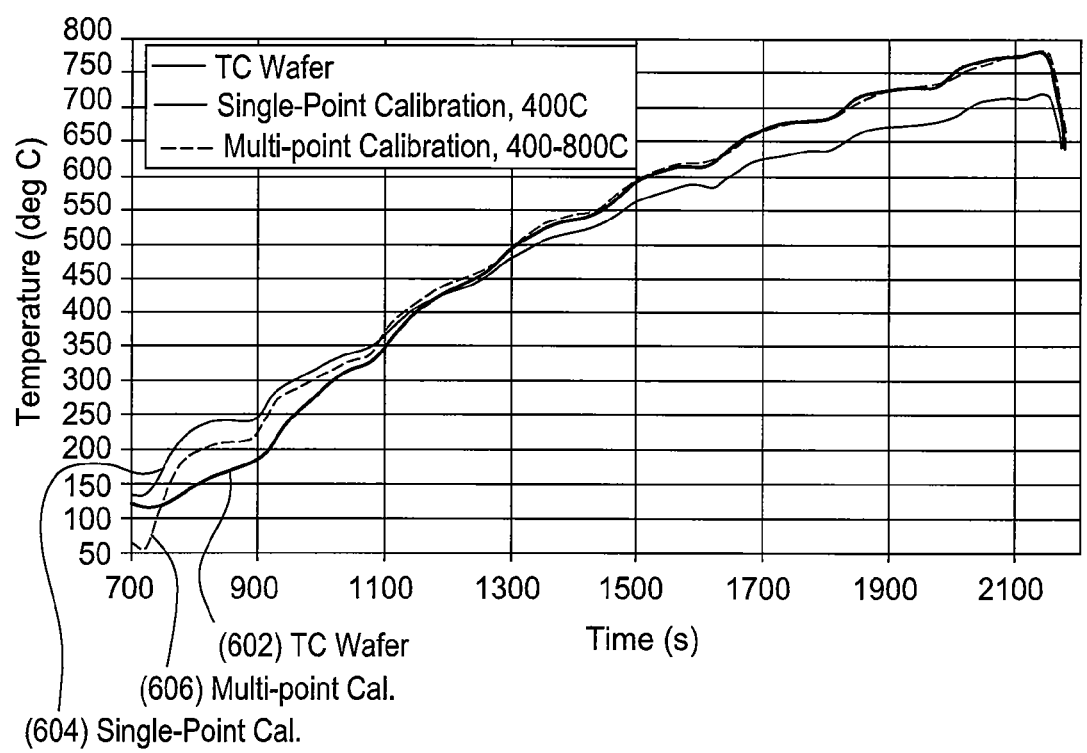
FIG. 6 is a graph showing performances of temperature tracking determined by different calibration approaches as a function of time.

The present invention provides a stable closed-loop temperature control of a substrate for low and high temperature processing by calibrating the pyrometers at multiple temperature points in a wide range of 300-1200° C. using a polynomial (least-squares) curve fitting or a linear curve fitting approach to compensate for emissivity variation of the substrate and/or support plate. FIG. 6 illustrates performances of temperature tracking determined by different calibration approaches as a function of time. Line 602 represents the temperature measured by the thermocouple substrate. Line 604 represents the substrate temperature determined by the conventional radiation pyrometer using single-point calibration. Line 606 represents the substrate temperature determined by the InAs pyrometer detector using multi-point calibration performed in accordance with the invention. As can be seen, multi-point calibration provides good reference temperature tracking over low and high temperature range (300-780° C.) while the conventional single-point approach fails to accurately measure the substrate temperature except for 400° C. where the calibration point was taken. It has been observed that the multi-point temperature calibration even allows reference temperature tracking within ±4° C. in a wide temperature window of 300° C. to 1200° C.

While the foregoing is directed to embodiments of the present invention, other and further embodiments of the invention may be devised without departing from the basic scope thereof, and the scope thereof is determined by the claims that follow.

What is claimed is:

1. A method of processing a substrate in a processing chamber, comprising:
 using a calibrated substrate in a calibration process to establish a set of reference temperature readings corresponding to actual temperature readings of a production substrate during a deposition process, the calibrated substrate having a known emissivity and a thermocouple embedded therein;
 epitaxially forming a layer stack on the production substrate placed on a support plate disposed within the processing chamber;
 measuring a temperature of the production substrate with a first pyrometer disposed over the substrate to establish a first set of measured temperature readings associated with the production substrate;
 measuring a temperature of the support plate with a second pyrometer disposed below the support plate to establish a second set of measured temperature readings associated with the support plate;
 calibrating the first pyrometer at multiple temperature points based on the set of reference temperature readings obtained from the calibrated substrate during the calibration process to generate a first set of calibrated temperature readings corresponding to actual temperature readings of the production substrate;
 calibrating the second pyrometer using the first set of calibrated temperature readings as a reference by curve fitting the second set of measured temperature readings previously taken from the support plate with the first set of calibrated temperature readings obtained from the calibrated first pyrometer to generate a second set of calibrated temperature readings corresponding to actual temperature readings of the support plate; and
 controlling a power supplied to a heat source configured to heat the production substrate based on the second set of calibrated temperature readings corresponding to actual temperature readings of the support plate.

2. The method of claim 1, wherein the first pyrometer is calibrated by curve fitting the first set of measured temperature readings taken from the production substrate with the set of reference temperature readings obtained from the calibrated substrate at multiple temperature points within a range between about 300° C. and about 900° C. using a computational method.

3. The method of claim 1, wherein the temperature of the substrate and the support plate is measured at a wavelength between about 2 and about 4.8 micrometers.

4. The method of claim 2, wherein the computational method comprises polynomial curve fit, multi-linear fit, best curve fit, or averaging curve fit.

5. The method of claim 3, wherein the temperature of the substrate and the support plate is measured using a photodetector selected from the group consisting of InAs, InGaAs, and PbS diode photodetectors.

6. The method of claim 1, wherein the layer stack comprises a graded $Si_xGe_{1-x}$ layer (where x is in the range from 0 to 1) deposited over a Ge-containing layer.

7. A method of controlling substrate temperature during substrate processing, comprising:
using a calibrated substrate in a calibration process to provide a set of reference temperature readings in a temperature range of about 200° C. to about 900° C., the set of reference temperature readings corresponding to actual temperature readings of a production substrate during a deposition process, and the calibrated substrate has a known emissivity and a thermocouple embedded therein;
forming a first layer on the production substrate placed on a support plate disposed within a deposition process chamber at a temperature range between about 300° C. and about 550° C.;
measuring a temperature of the production substrate at a wavelength between about 2 and about 4.8 micrometers using a first optical monitoring device disposed above the substrate to establish a first set of measured temperature readings associated with the production substrate;
measuring a temperature of the support plate on which the production substrate is placed at a wavelength between about 2 and about 4.8 micrometers using a second optical monitoring device disposed below the support plate to establish a second set of measured temperature readings associated with the support plate;
calibrating the first optical monitoring device at multiple temperature points based on the set of reference temperature readings obtained from the calibrated substrate during the calibration process to provide a first set of calibrated temperature readings associated with the production substrate;
calibrating the second optical monitoring device by curve fitting the second set of measured temperature readings previously taken from the support plate with the first set of calibrated temperature readings obtained from the calibrated first optical monitoring device to provide a second set of calibrated temperature readings associated with the support plate;
controlling a power supplied to a heat source configured to heat the production substrate based on the second set of calibrated temperature readings obtained from the calibrated second optical monitoring device;
forming a second layer over the first layer at a temperature range between about 450° C. and about 900° C., wherein the second layer is different from the first layer;
measuring a temperature of the production substrate at a wavelength between about 2 and about 4.8 micrometers using the first optical monitoring device disposed above the substrate to establish a third set of measured temperature readings associated with the production substrate;
measuring a temperature of the support plate on which the production substrate is placed at a wavelength between about 1 and about 3.8 micrometers using the second optical monitoring device disposed below the support plate to establish a fourth set of measured temperature readings associated with the support plate;
calibrating the first optical monitoring device at multiple temperature points based on the set of reference temperature readings previously obtained from the calibrated substrate during the calibration process to provide a third set of calibrated temperature readings corresponding to actual temperature readings of the production substrate;
calibrating the second optical monitoring device by curve fitting the fourth set of measured temperature readings previously taken from the support plate with the third set of calibrated temperature readings obtained from the calibrated first optical monitoring device to provide a fourth set of calibrated temperature readings corresponding to actual temperature readings of the support plate; and
controlling the amount of power supplied to the heat source configured to heat the production substrate based on the fourth set of calibrated temperature readings corresponding to actual temperature readings of the support plate.

8. The method of claim 7, wherein the first and second optical monitoring devices comprise a photodetector selected from the group consisting of InAs, InGaAs, and PbS diode photodetectors.

9. The method of claim 7, wherein the measuring the temperature of the substrate are separately or concurrently with the measuring the temperature of the support plate.

10. The method of claim 7, wherein the calibrating the first optical monitoring device comprises curve fitting the first set of measured temperature readings with the set of reference temperature readings by a computational method to calibrate out any non-linear discrepancies.

11. The method of claim 10, wherein the computational method comprises polynomial curve fit, multi-linear fit, best curve fit, or averaging curve fit.

12. The method of claim 7, wherein the first optical monitoring device is calibrated at multiple predetermined temperature points between about 200° C. and about 500° C. to provide the first set of calibrated temperature readings.

13. The method of claim 7, wherein the first and second layers are selected from the group consisting of silicon, silicon carbide, gallium nitride, gallium arsenide, silicon-germanium ($Si_xGe_{1-x}$) (where x is in the range from 0 to 1), silicon-germanium-carbon ($Si_xGe_yC_{1-x-y}$) (where x is in the range from 0 to 1), and other crystalline semiconductor materials.

14. The method of claim 13, wherein the first and second layers are epitaxial, monocrystalline, polycrystalline, or amorphous layer.

15. The method of claim 13, wherein the first optical monitoring device is calibrated at multiple predetermined temperature points in a range between about 450° C. and about 900° C. to provide the third set of calibrated temperature readings.

16. A method of processing a substrate in a processing chamber, comprising:
using a calibrated substrate in a calibration process to establish a set of reference temperature readings corresponding to actual temperature readings of a production substrate during a deposition process, the calibrated substrate has a known emissivity and a thermocouple embedded therein;
epitaxially forming a layer stack on the production substrate placed on a support plate disposed within the processing chamber;
measuring a temperature of the production substrate with a first pyrometer disposed over the substrate to establish a first set of measured temperature readings associated with the production substrate;

measuring a temperature of the support plate with a second pyrometer disposed below the support plate to establish a second set of measured temperature readings associated with the support plate;

calibrating the first pyrometer at multiple temperature points based on the set of reference temperature readings obtained from the calibrated substrate during the calibration process to generate a first set of calibrated temperature readings corresponding to actual temperature readings of the production substrate;

comparing the second set of measured temperature readings taken previously from the support plate with the set of reference temperature readings previously obtained from the calibrated substrate at multiple temperature points;

adjusting a power supplied to a heat source configured to heat the production substrate based on the comparison to control the temperature of the production substrate;

calibrating the second pyrometer using the first set of calibrated temperature readings as a reference by curve fitting the second set of measured temperature readings previously taken from the support plate with the first set of calibrated temperature readings obtained from the calibrated first pyrometer to generate a second set of calibrated temperature readings corresponding to actual temperature readings of the support plate; and controlling a power supplied to a heat source configured to heat the production substrate based on the second set of calibrated temperature readings corresponding to actual temperature readings of the support plate.

17. The method of claim 16, wherein the first pyrometer is calibrated by curve fitting the first set of measured temperature readings taken from the production substrate with the set of reference temperature readings obtained from the calibrated substrate at multiple temperature points within a range between about 300° C. and about 900° C. using a computational method.

* * * * *